United States Patent [19]
Brown et al.

[11] Patent Number: 5,379,224
[45] Date of Patent: Jan. 3, 1995

[54] GPS TRACKING SYSTEM
[75] Inventors: Alison K. Brown, Monument, Colo.; Mark A. Sturza, Woodland Hills, Calif.
[73] Assignee: NAVSYS Corporation, Colorado Springs, Colo.
[21] Appl. No.: 800,850
[22] Filed: Nov. 29, 1991
[51] Int. Cl.6 .............................................. G01S 5/02
[52] U.S. Cl. .................. 364/449; 73/178 R; 340/989; 342/357; 364/516
[58] Field of Search ............... 364/443, 449, 516; 340/988–994; 342/352, 357; 73/178 R

[56]  References Cited
U.S. PATENT DOCUMENTS

| | | | |
|---|---|---|---|
| 4,359,733 | 11/1982 | O'Neill | 342/357 X |
| 4,622,557 | 11/1986 | Westerfield | 342/357 |
| 4,701,760 | 10/1987 | Raoux | 340/993 |
| 4,754,283 | 6/1988 | Fowler | 342/461 |
| 4,774,672 | 9/1988 | Tsunoda et al. | 364/449 |
| 4,785,463 | 11/1988 | Janc et al. | 364/443 X |
| 4,804,937 | 2/1989 | Barbiaux et al. | 464/424.01 X |
| 4,819,174 | 4/1989 | Furuno et al. | 364/444 |
| 4,821,294 | 4/1989 | Thomas, Jr. | 342/352 X |
| 4,894,655 | 1/1990 | Joquet et al. | 340/988 |
| 4,894,662 | 1/1990 | Counselman | 342/357 |
| 4,912,475 | 3/1990 | Counselman III | 342/352 |
| 4,928,106 | 5/1990 | Ashjaee et al. | 342/352 |
| 5,014,206 | 5/1991 | Scribner et al. | 364/449 |
| 5,068,656 | 11/1991 | Sutherland | 340/989 |
| 5,119,102 | 6/1992 | Barnard | 342/357 |
| 5,153,598 | 10/1992 | Alves, Jr. | 342/352 |
| 5,155,490 | 10/1992 | Spradley, Jr. et al. | 342/357 |
| 5,187,805 | 2/1993 | Bertiger et al. | 342/352 X |
| 5,202,829 | 4/1993 | Geier | 364/449 |
| 5,223,844 | 6/1993 | Mansell et al. | 342/357 |
| 5,225,842 | 7/1993 | Brown et al. | 342/357 |
| 5,247,440 | 9/1993 | Capurka et al. | 364/449 X |

FOREIGN PATENT DOCUMENTS

| | | |
|---|---|---|
| 1298387 | 3/1992 | Canada . |
| 1298903 | 4/1992 | Canada . |
| 0444738 | 9/1991 | European Pat. Off. . |
| 0512789 | 11/1992 | European Pat. Off. . |

OTHER PUBLICATIONS

IEEE Plans '90 Position Location and Navigation Sympoium, Las Vegas, Mar. 20–23, 1990, IEEE New York, NY, US. Hunter et al: 'Vehicle navigation using differential GPS', pp. 392–398.
Proceedings of the IEEE-F Communications, Radar and Signal Processing, vol. 127, No. 2 Apr. 1980, Stevenage, GB. Blair et al: 'receivers for the NAVSTAR global positioning system', pp. 163–167.
Navigation "Surveys" Summer, 1984, vol. 31, #2, by P. F. MacDoran et al.
Navigation Journal of The Institute of Navigation, vol. 32, No. 4, Winter, 1985–86, Printed in U.S.A., "Terrestrial Evaluation of the GPS Standard Positioning Service": by Francis W. Mooney.
Navigation Journal of the Institute of Navigation, vol. 33, No. 4, Winter, 1986–87, Printed in U.S.A., "DiffStar: A Concept for Differential GPS in Northern Norway", by Hermod Fjereide.
Navigation Journal of the Institute of Navigation, vol. 36, No. 3, Fall, 1989, Printed in U.S.A., "Loran-C Vehicle Tracking in Detroit's Public Safety Dispatch System", by Laurence J. Cortland.
GPS World, News and Applications of the Global Positioning System, Mar./Apr. 1990.

Primary Examiner—Thomas G. Black
Assistant Examiner—Collin W. Park
Attorney, Agent, or Firm—William E. Hein

[57] ABSTRACT

A low cost tracking system employing satellites of the global positioning system (GPS) is suitable for applications involving radiosondes, sonobuoys, and other objects. The tracking system includes a sensor mounted on each object which digitally samples the GPS satellite signals and records them in a data buffer. The digital samples are then transmitted, at a rate lower than that at which the GPS satellite signals were sampled, over a data telemetry link, interleaved with other telemetry data from the object. The GPS data is processed in a data processing workstation where the position and velocity of the sensor, at the time the data was sampled, is computed. The data buffer in the sensor is periodically refreshed, and the workstation periodically computes the new position and velocity of the sensor. Differential corrections are also provided at the workstation to aid in signal acquisition and to increase the precision of the position fix.

7 Claims, 6 Drawing Sheets

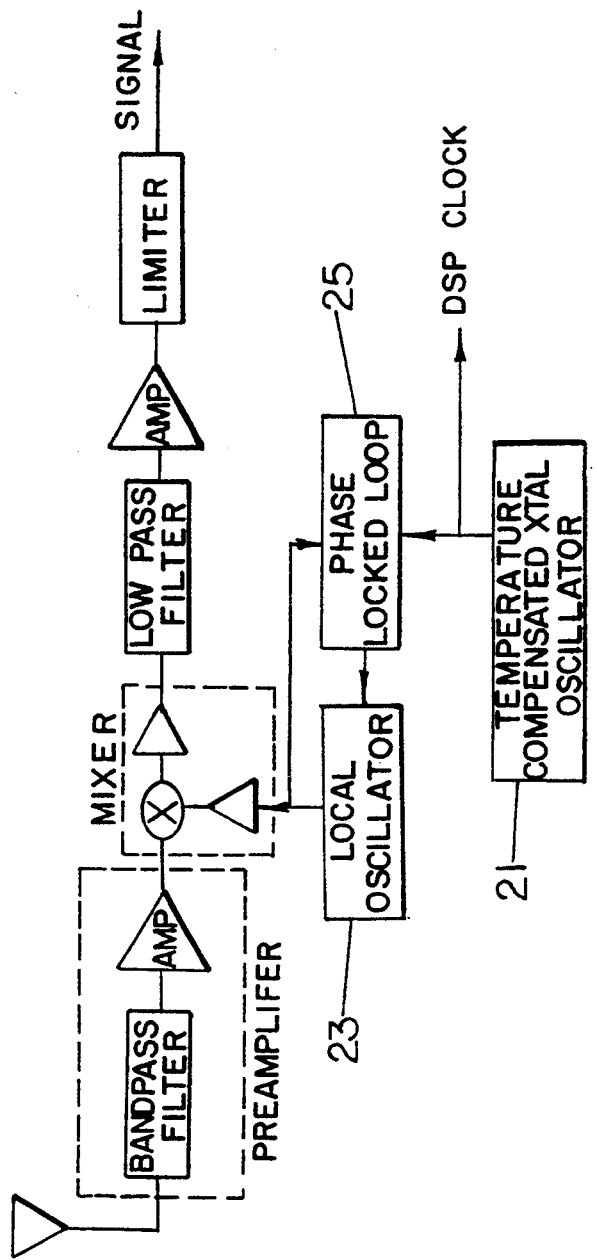
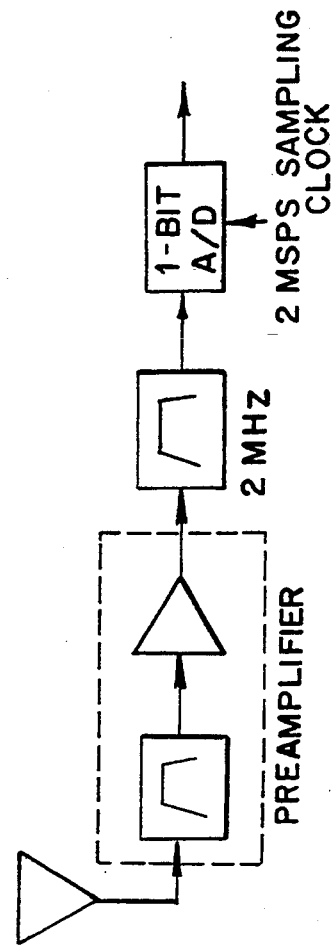

GPS TRACKING SYSTEM

BACKGROUND AND SUMMARY OF THE INVENTION

This invention relates generally to navigation systems and more specifically to a system for positioning radiosondes, sonobuoys, aircraft, ships, land vehicles, and other objects on or near the earth's surface using satellites of the Global Positioning System (GPS). The GPS is a multiple-satellite based radio positioning system in which each GPS satellite transmits data that allows a user to precisely measure the distance from selected ones of the GPS satellites to his antenna and to thereafter compute position, velocity, and time parameters to a high degree of accuracy, using known triangulation techniques. The signals provided by the GPS can be received both globally and continuously. The GPS comprises three major segments, known as the space, control, and user segments.

The space segment, when fully operational, will consist of twenty-one operational satellites and three spares. These satellites will be positioned in a constellation such that typically seven, but a minimum of four, satellites will be observable by a user anywhere on or near the earth's surface. Each satellite transmits signals on two frequencies known as L1 (1575.42 MHz) and L2 (1227.6 MHz), using spread spectrum techniques that employ two types of spreading functions. C/A and P pseudo random noise (PRN) codes are transmitted on frequency L1, and P code only is tranmitted on frequency L2. The C/A or coarse/acquisition code, is available to any user, military or civilian, but the P code is only available to authorized military and civilian users. Both P and C/A codes contain data that enable a receiver to determine the range between a satellite and the user. Superimposed on both the P and C/A codes is the navigation (Nav) message. The Nav message contains 1) GPS system time; 2) a handover word used in connection with the transition from C/A code to P code tracking; 3) ephemeris data for the particular satellites being tracked; 4) almanac data for all of the satellites in the constellation, including information regarding satellite health, coefficients for the ionospheric delay model for C/A code users, and coefficients used to calculate universal coordinated time (UTC).

The control segment comprises a master control station (MCS) and a number of monitor stations. The monitor stations passively track all GPS satellites in view, collecting ranging data and satellite clock data from each satellite. This information is passed on to the MCS where the satellites' future ephemeris and clock drift are predicted. Updated ephemeris and clock data are uploaded to each satellite for re-transmission in each satellite's navigation message. The purpose of the control segment is to ensure that the information transmitted from the satellites is as accurate as possible.

GPS is intended to be used in a wide variety of applications, including space, air, sea, and land object navigation, precise positioning, time transfer, attitude reference, surveying, etc. GPS will be used by a variety of civilian and military organizations all over the world. A number of prior art GPS receivers have been developed to meet the needs of the diverse group of users. These prior art GPS receivers are of a number of different types, including sequential tracking, continuous reception, multiplex, all in view, time transfer, and surveying receivers.

A GPS receiver comprises a number of subsystems, including an antenna assembly, an RF assembly, and a GPS processor assembly. The antenna assembly receives the L-band GPS signal and amplifies it prior to insertion into the RF assembly.

The RF assembly mixes the L-band GPS signal down to a convenient IF frequency. Using various known techniques, the PRN code modulating the L-band signal is tracked through code-correlation to measure the time of transmission of the signals from the saellite. The doppler shift of the received L-band signal is also measured through a carrier tracking loop. The code correlation and carrier tracking function can be performed using either analog or digital processing.

The control of the code and carrier tracking loops is provided by the GPS processor assembly. By differencing this measurement with the time of reception, as determined by the receiver's clock, the pseudo range between the receiver and the satellite being tracked may be determined. This pseudo range includes both the range to the satellite and the offset of the receiver's clock from the GPS master time reference. The pseudo range measurements and navigation data from four satellites are used to compute a three dimensional position and velocity fix, to calibrate the receiver's clock offset, and to provide an indication of GPS time.

The receiver processor controller (RPC) processing and memory functions performed by a typical GPS receiver include monitoring channel status arid control, signal acquisition and reacquisition, code and carrier tracking loops, computing pseudo range (PR) and delta range (DR) measurements, determining data edge timing, acquisition and storage of almanac and ephemeris data broadcast by the satellites, processor control and timing, address and command decoding, timed interrupt generation, interrupt acknowledgment control, and GPS timing, for example. These functions are fixed point operations and do not require a floating point coprocessor.

The navigation processing and memory functions performed by a typical GPS receiver include satellite orbit calculations and satellite selection, atmospheric delay correction calculations, navigation solution computation, clock bias and rate estimates, computation of output information, and preprocessing and coordinate conversion of aiding information, for example. These functions require significant amounts of processing and memory and are generally performed using a floating point coprocessor.

The GPS standard positioning service provides a navigation accuracy of 100 m 2 dRMS. A number of applications of the GPS require higher levels of accuracy. Accuracy can be improved using a technique known as differential GPS (DGPS). This technique involves operating a GPS receiver in a known location. The receiver is used to compute satellite pseudo range correction data using prior knowledge of the correct satellite pseudo ranges, which are then broadcast to users in the same geographic area. The pseudo range corrections are incorporated into the navigation solution of another GPS receiver to correct the observed satellite pseudo range measurements, thereby improving the accuracy of the position determination. Correlation of the errors experienced at the reference station and at the user location is dependent on the distance between them, but they are normally highly correlated for a user within 350 kilometers of the reference station.

An alternative to the GPS receiver known in the prior art is the GPS translator or transdigitizer, as described in U.S. Pat. No. 4,622,557, for example. These translators or transdigitizers typically include only the antenna assembly and RF assembly portions of a GPS receiver. Translators are typically employed in missile tracking applications where small, lightweight, expendable sensors are required. The GPS C/A code spread spectrum signals received by the translator are combined with a pilot carrier and transmitted at S-band frequencies (2200 to 2400 MHz). A GPS translator processor located at the telemetry tracking site receives these translated GPS C/A code signals and estimates the position and velocity of the object. The transdigitizer retransmits the digitally sampled GPS signal at 2 Msps using quadraphase modulation at 149 to 170 MHz.

Known variants of the GPS translator are the digital translator and the transdigitizer. An object-borne GPS digital translator or transdigitizer operates to convert the GPS C/A code spread spectrum signals to base band and perform in-phase and quadrature phase sampling at a rate of about 2 MHz. Transdigitized or translated GPS signals are processed in a ground based translator processing system in a similar manner to GPS signals.

A third variant of the GPS translator is the codeless GPS receiver, as typified by the teachings of U.S. Pat. No. 4,754,283. This receiver ignores the bi-phase code and recovers the carrier frequency of all satellites in view of the receiving antenna. A telemetry transmitter transmits a signal that contains the GPS carrier frequency information to a ground-based telemetry receiver. This data is used to derive the speed of the sonde. Since the GPS code is not tracked, the position of the sonde cannot be computed using this method. This system uses a telemetry link at 403 MHz with a bandwidth of 20 KHz and has the advantage of requiring less bandwidth than the transdigitizer but the disadvantage of only providing velocity data instead of both position and velocity data.

In summary, prior art GPS receivers may be one of three types. In the first type, all navigation processing activities occur at the receiver, which outputs the position and velocity of the tracked object using either a single computer or an RPC and navigation computer, in which there is substantial interconnection between the RPC functions and the navigation functions for satellite selection and acquisition. In the second type of GPS receiver, the GPS signal is remoted by translation or variations thereof and the signal is tracked at a ground processing facility where the object position and velocity are derived. In accordance with this latter approach, significant bandwidth is required to transmit the translated signal. In the third type, the carrier frequency of the GPS signals is measured and retransmitted to the ground processing facility where only the velocity of the object can be derived.

It is therefore the principal object of the present invention to provide a low cost tracking system for radiosondes, sonobuoys, aircraft, ships, land vehicles, and other objects, using GPS satellites, that is capable of providing the position and velocity of multiple objects without requiring a 2 MHz bandwidth data link.

This and other objects are accomplished in accordance with the illustrated preferred embodiment of the present invention by providing a GPS sensor module that supplies the data required to locate a particular object, a one-way telemetry link, and a data processing workstation to process the data and display the object position and velocity. The GPS sensor module comprises an antenna and a sensor. The sensor operates autonomously following application of operating power. The sensor digitally samples the signals from visible GPS satellites and stores this data in a digital buffer. No processing functions are performed by the sensor, thereby permitting significant reductions in the cost thereof. The raw satellite data stored in the buffer, interleaved with other telemetry data from the sonde or other object, are transmitted back to the data processing workstation. Using this set of raw satellite data, the position and velocity of the sensor can be determined at the time the data was recorded by the sensor to a precision of 100 meters. If differential corrections are also provided at the data processing workstation, the accuracy of the position fix can be improved to better than 10 meters. If a 20 kHz data link is used and the GPS signals are sampled at 2 Mbps, a 1-second set of GPS data can be provided every 100 seconds, or a 0.5-second set of GPS data every 50 seconds, or a 0.1-second set of data every 10 seconds. The principal advantage afforded by the present invention is its ability to provide extremely accurate position, velocity, and time information for radiosondes, sonobuoys, and other objects using a low cost sensor and a conventional data telemetry link. By eliminating all processing functions performed in prior art GPS sensors, significant cost reductions are achieved over existing GPS receiver designs. By reducing the data link bandwidth from the 2 MHz required of prior art transdigitizers, conventional telemetry links may be employed to retransmit the data. For low cost data applications, such as sonobuoys or radiosondes, a position and velocity fix is only required at a low rate (e.g. every 10 seconds), a requirement that is accomodated by the present invention.

BRIEF DESCRIPTION OF THE DRAWINGS

FIG. 3A is a block diagram of one embodiment of the RF/IF section of the sensor of FIG. 2.

FIG. 3B is a block diagram of another embodiment of the RF/IF section of the sensor of FIG. 2.

DETAILED DESCRIPTION OF THE INVENTION

The present invention is directed to an apparatus and method for computing the position and velocity of multiple objects equipped with low cost sensors using a data processing workstation. The GPS satellite signals are digitally sampled in accordance with techniques employed in conventional digital GPS receivers, and the data is periodically recorded in a digital data buffer. This data is then interleaved with other telemetry data from the object being tracked and transmitted using a conventional telemetry data link having a typical bandwidth of 20 KHz. The GPS data block is recorded and processed by the data processing workstation to compute the position and velocity of the sensor, at the time the data was sampled. Differential GPS corrections are also provided at the data processing workstation to improve the accuracy of the position computation.

Figure 1:
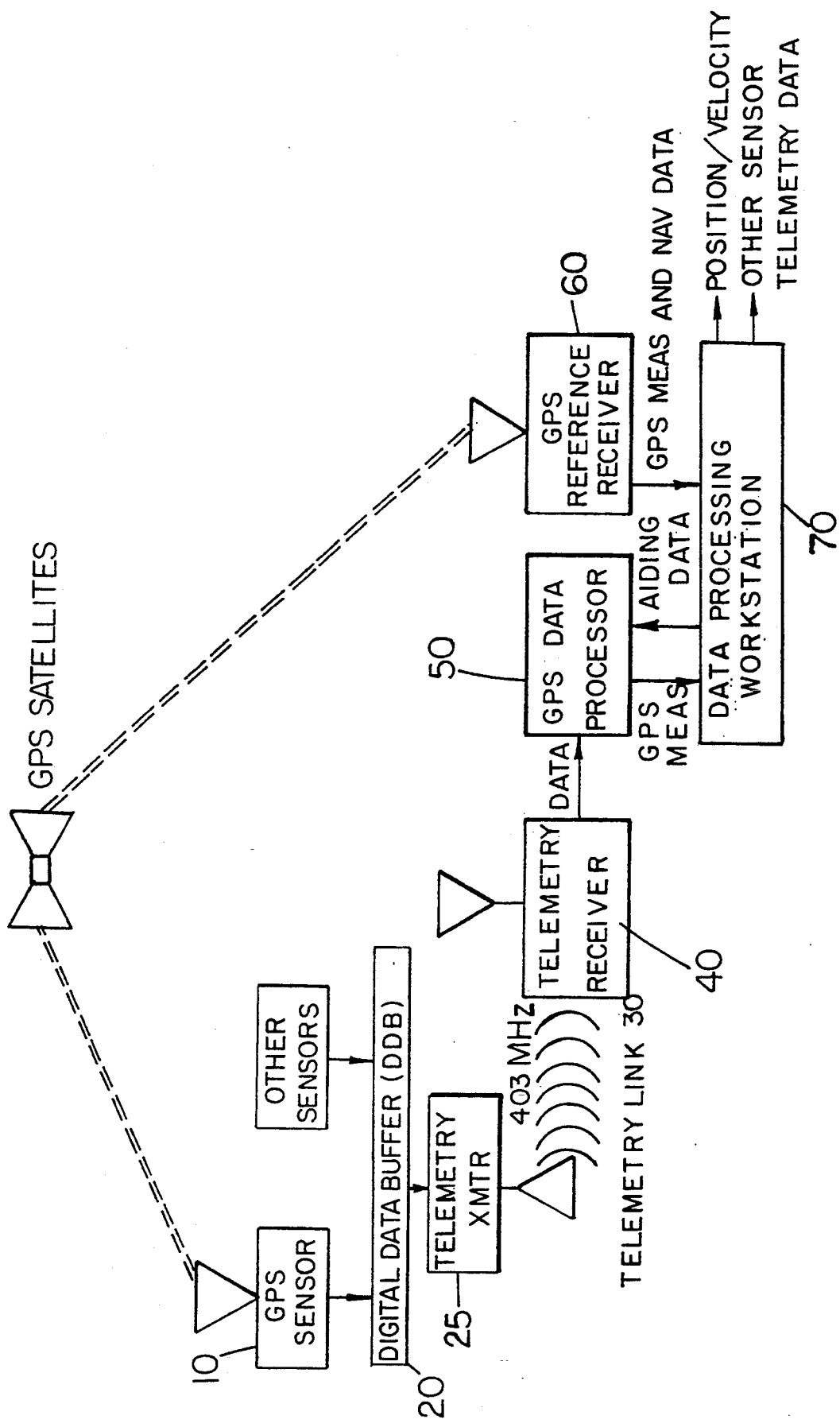
FIG. 1 is a block diagram illustrating the primary components of the GPS object tracking system of the present invention.

Referring now to the block diagram of FIG. 1, the object tracking system of the present invention primarily comprises a sensor 10, a data buffer 20, a telemetry link 30 that includes a telemetry transmitter 25 and a telemetry receiver 40, a GPS data processor 50, a GPS reference receiver 60, and a data processing workstation 70.

Figure 2:
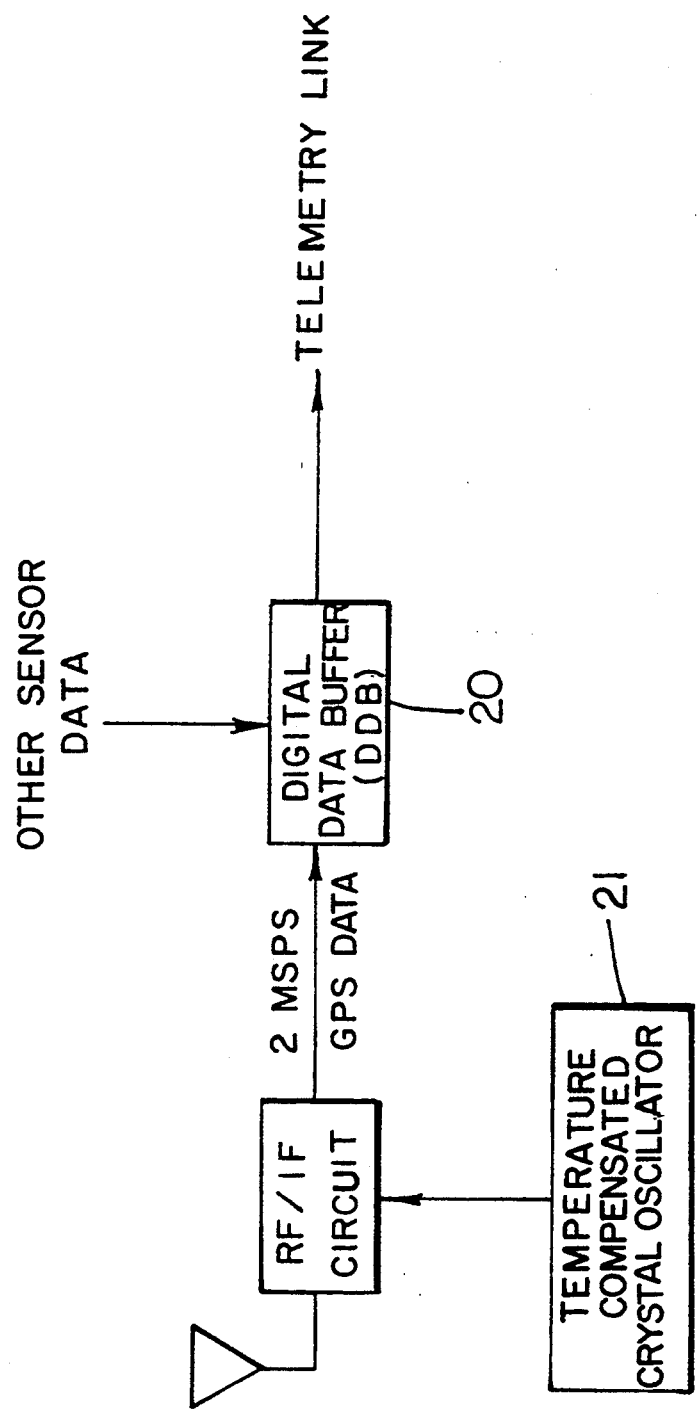
FIG. 2 is block diagram of the sensor employed in the GPS object tracking system of FIG. 1.

A representative implementation of sensor 10 employs a simplified method of frequency synthesis, a temperature compensated crystal oscillator (TCXO) 21 or other low cost oscillator, and a digital data buffer (DDB) 20. Detailed block diagrams of sensor 10 are shown in FIGS. 2 and 3A. Frequency synthesis within sensor 10 is based on an oscillator frequency (FO) of 6.1539 MHz that is produced by temperature compensated crystal oscillator 21. A local oscillator frequency (LO), produced by local oscillator 23, is 256×FO=1575.3984 MHz. The power of 2 multiplier (256) simplifies the design of a phase lock loop (PLL) 25 that is employed to lock the frequency of the local oscillator 23 to that of the crystal oscillator 21. The resulting intermediate frequency (IF) is 1575.42 MHz−256 FO=21.6 KHz. This IF is far enough above DC to allow distinction between positive and negative doppler shifts. It is also close enough to DC to result in minimal post correlation noise increase due to spectral noise folding. The sampling clock used by the digital data buffer 20 is FO/3=2.01513 MHz, a frequency that is ideal in that it is not related to the 1.023 MBS chip rate. The time sample of the raw GPS data is stored in the digital data buffer 20 and is transmitted at a lower rate to the GPS data processor 50. An alternative embodiment of the RF/IF section of sensor 10 is illustrated in FIG. 3B. The antenna output is bandpass filtered and amplified by a preamplifier. The preamplifier output is bandlimited to the C/A spectrum of 2 MHz. The bandlimited signal is digitized by a 1-bit analog to digital converter.

Data is transferred between sensor 10 and GPS data processor 50 via a conventional data telemetry link 30. Exemplary of the conventional telemetry links that may be employed for this purpose are those operating in the 403 MHz meteorology frequency band. The GPS data processor 50 may comprise, for example, a high speed digital signal processing card embedded in the data processing workstation 70. The data processing workstation 70 processes the block of GPS data recorded by the sensor 10 and provides pseudo-range and delta-range measurements for all visible GPS satellites to the data processing workstation 70.

Data processing workstation 70 uses the data provided by GPS reference receiver 60 and GPS data processor 50 to compute the object (sensor 10) position and velocity.

Figure 4:
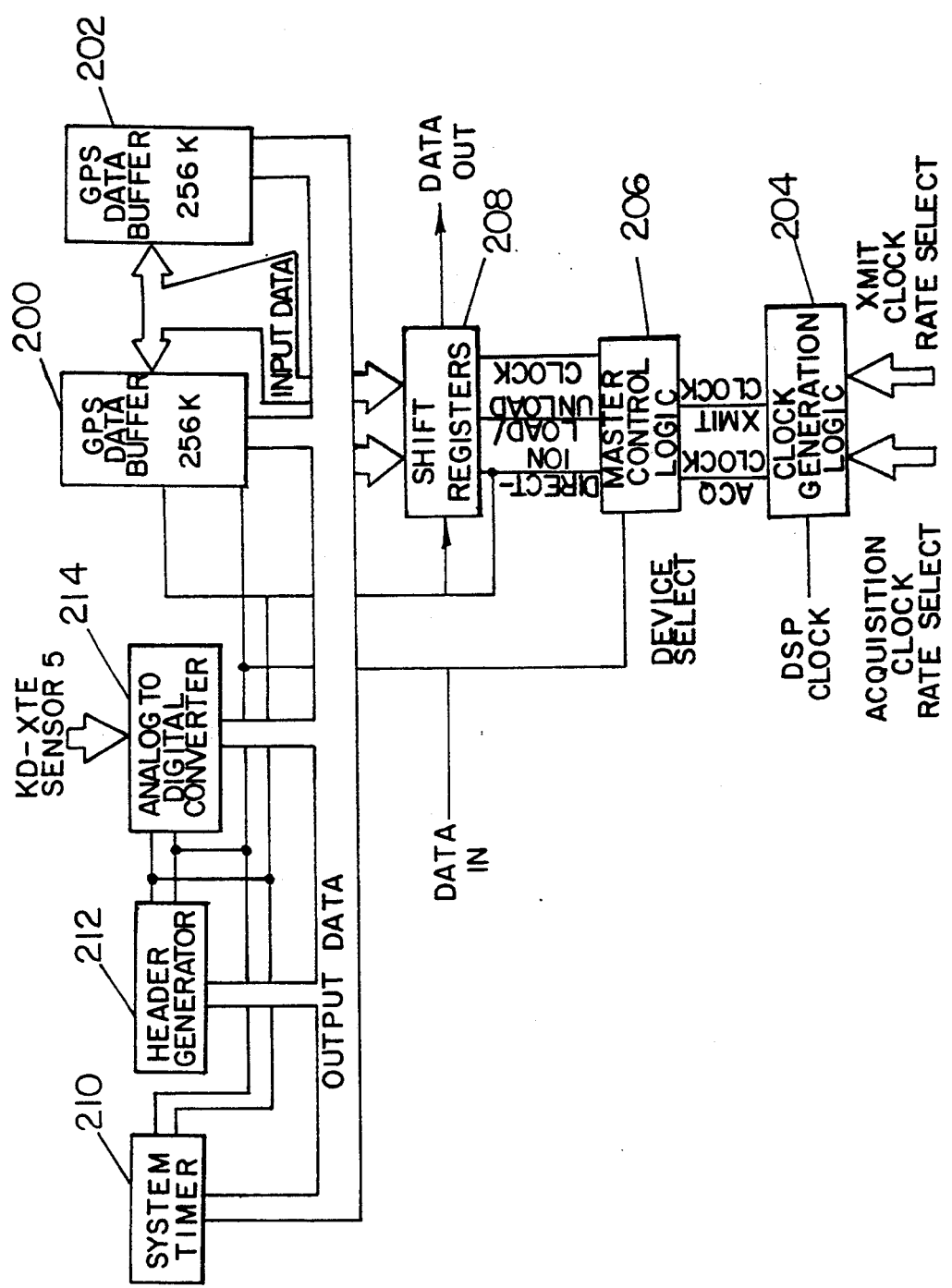
FIG. 4 is a block diagram of the digital data buffer employed in the sensor of FIG. 2.

Referring now to FIG. 4, a pair of GPS data buffers 200, 202 store a block of the 1-bit analog-to-digital samples at 2 MHz in a memory buffer. GPS data buffers 200, 202 comprise 256K × 8-bit memory devices that are configured in a double-buffering arrangement to allow one of them to be receiving GPS data while the other one is transmitting GPS data.

A clock generation logic unit 204 serves to generate timing signals used for synchronization. Signals that specify the operating clock rates are applied as inputs to clock generation logic unit 204. One of these input signals indicates the rate at which GPS data will be read from an A/D sampler and stored into a memory buffer. The other one of these signals indicates the rate at which the GPS data is taken from the memory buffer and transmitted to the receiving station over telemetry link 30. Clock generation logic unit generates a signal used to drive a system timer.

A master control logic unit 206 provides control signals for the remainder of the circuit comprising data buffer 20. It utilizes the clock signals generated by clock generation logic unit 204 to drive its timing and sequencing functions. The functions provided by master control logic unit 206 are 1) selection of the device to load a parallel/serial transmit register; 2) switching of the device to unload the serial/parallel receive register; 3) switching of the appropriate clock rate to GPS data buffer address counters; and 4) selection of the memory buffers for acquisition and transmission.

Shift registers 208 provide for the reception of the serial GPS data and the packing of it into an 8-bit data packet. The master control logic unit 206 then places the data packet into the current selected received data memory buffer. Shift registers 208 also takes an 8-bit data packet from the currently selected device (header, system time, analog data, or GPS data) and places it in the transmit register to be sent out serially.

A system timer 210, driven by clock generation logic unit 204, is employed to time-stamp the current data being transmitted so that the time it was acquired can be identified.

A header generator 212 serves to generate a unique binary pattern which is used to identify the beginning of a new data record. This allows the receiving station to recognize when a new data record has been sent.

An analog data converter 214 facilitates the inclusion of analog data which is gathered from various ones of the remote sensors 10. This data may be from just one or from several of sensors 10 that are time multiplexed.

The GPS data received by sensor 10 is interleaved with other digital telemetry data, such as pressure, temperature, and humidity, and is then transmitted as a block of data with an identifying header and time tag through the telemetry link 30. In the preferred embodiment of the present invention, a 25-millisecond block of GPS data is recorded (50 kilobits). This GPS data can then be relayed to the ground in 1 second using a 50-kbps data link, or in 10 seconds using a 5-kbps data link, or in 100 seconds using a 500-kbps data link. In alternative embodiments of the invention, smaller blocks of data may be selected, interspersed at regular interval s. This is equivalent to a multiplexed GPS receiver approach where 5-millisecond segments of data are collected, separated at 20-millisecond intervals. This approach would provide improved performance in a high acceleration environment. A variety of block sizes and frequencies for data transmission can be implemented, depending on the circumstances and the available data bandwidth.

Figure 5:
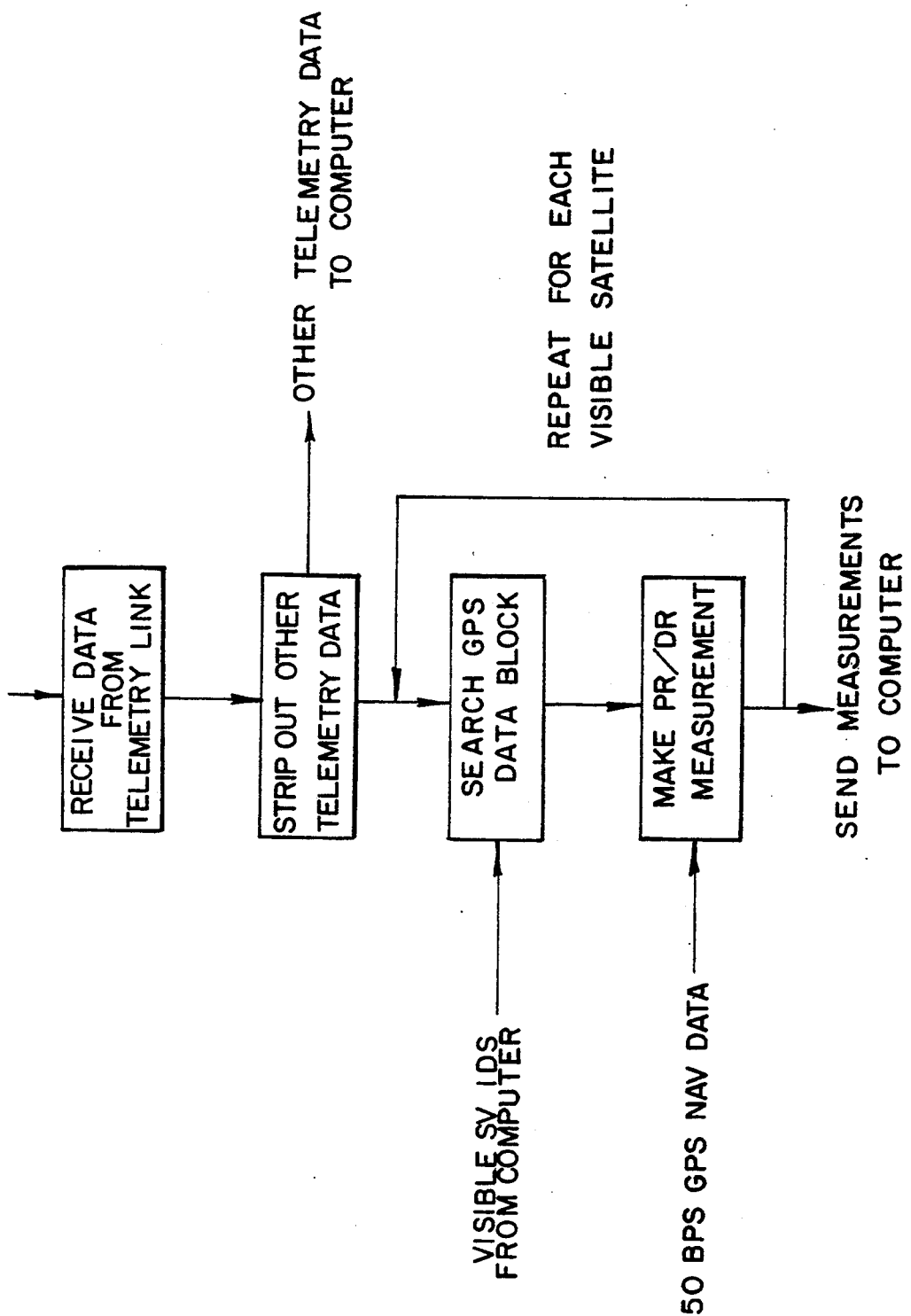
FIG. 5 is a flow chart of the process employed to determine the GPS measurement from telemetry data.

Referring now to FIG. 5, the telemetry data is received by the telemetry receiver 40 of FIG. 1 and is passed to the GPS data processor 50 for processing. In the preferred embodiment of the present invention, GPS data processor 50 comprises a digital signal processing microcomputer card installed in an IBM personal computer. The GPS data block is first separated from the telemetry data and is then processed to derive the GPS pseudo-range and delta-range measurements. The first step of this process is to acquire the GPS signals. The list of visible satellite IDs and estimates of their expected frequency shift and code phase is provided by the data processing workstation 70 from the GPS reference receiver 60. This information is used to search for the GPS satellite signals. The search through the recorded GPS data block is repeated at different code phases and frequencies until the signal is acquired. The software then switches to the track mode to measure the code phase and frequency using the complete GPS data block, initialized with the coarse estimate of phase and frequency from the search algorithm.

Figure 6:
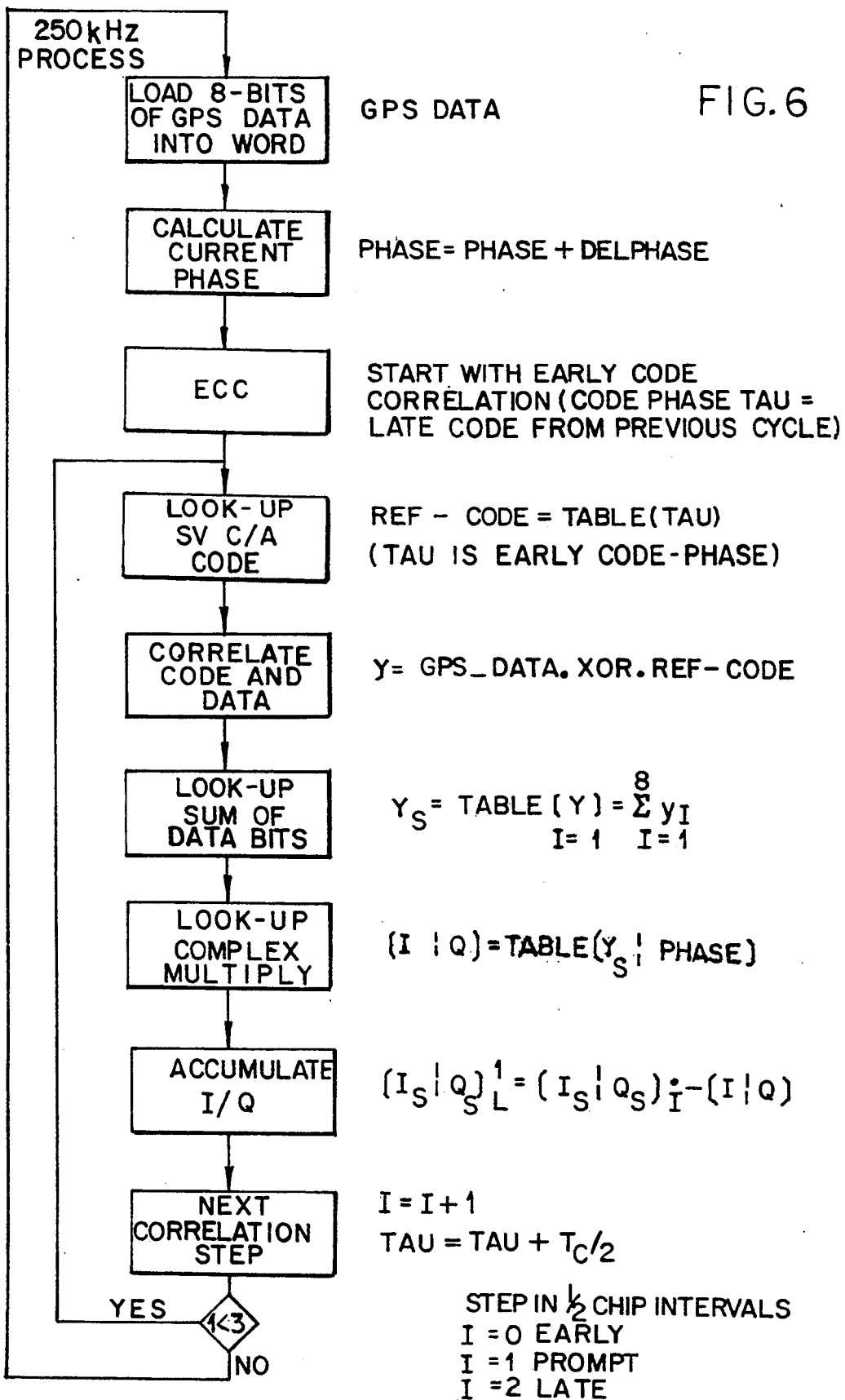
FIG. 6 is a flow chart of a high speed correlation and complex multiplication algorithm employed in two of the functional blocks of the flow chart of FIG. 5.

A key feature of the present invention is the high speed code correlation and complex multiplication algorithm illustrated in FIG. 6. To perform a high speed search, it is necessary to perform multiple code correlations at different code phases to detect the GPS signal. The algorithm illustrated performs these functions in parallel in software. Using a TMS320C40 chip, nine correlators can be operated in parallel in real time. Using a 10-millisecond dwell period, the full 2046 possible half-chip C/A code phases can be searched in 2.27 seconds. Once the signal has been initially acquired at start-up, reacquisition requires significantly smaller search windows and can be performed in a fraction of a second on each new data block.

The same high speed code correlation and complex multiplication algorithm is used to perform code and carrier tracking. One-millisecond accumulated in-phase and quadrature signals are provided for early, late, and prompt code phases using a look-up table technique. The first step is to compute the current code phase and look up the the C/A code sequence at that phase from a table stored in memory. This 8-bit C/A code is then exclusive-ored with 8 bits of the GPS data to perform code correlation. A second look-up table is then used to compute the sum of the resulting bits, as follows:

$$\text{code\_sum} = \text{Table}(Y) = \sum_{i=1}^{8} y_i$$

where $Y_i$ is the ith bit of address Y. This accumulated sum is then complex multiplied with the current estimated carrier phase, again using a table look-up with address code_sum and the phase. The result is the accumulated I and Q signals packed into a 32-bit word. The I and Q signals include a constant offset to guarantee that they are always positive, in accordance with the following relationships:

$$[I \mid Q] = \text{Table}(X) \quad X = [\text{code\_sum} \mid \text{phase}]$$
$$I = \text{Codesum} * \cos(\text{Phase}) + \text{constant}$$
$$Q = \text{Codesum} * \sin(\text{Phase}) + \text{constant}$$

The 32-bit I/Q word is then added into a running sum to accumulate to 1 millisecond. $[I_s \mid Q_s] = [I_s \mid Q_s] + [I \mid Q]$. At 1 millisecond, the 16 bits of I and 16 bits of Q are masked off and the accumulated I/Q offset is subtracted out to give 2-second complement results. These 1-millisecond I and Q sums are then processed in the code and carrier tracking loops. The process is repeated for early, late, and prompt code phases. Early and late I/Q samples are processed to close the code tracking loops and provide PR measurements, as performed in a conventional GPS receiver. Prompt I/Q samples are processed to close the carrier tracking loops and provide delta range (DR) or Doppler measurements, as performed in a conventional GPS receiver.

The algorithm described above performs the functions provided in digital hardware in a conventional GPS receiver or translator processing system. The high speed algorithm described above allows these functions to be performed in real time using a digital signal processing card with a processor such as the TMS320C40. This approach provides the flexibility required to search, acquire, and track the blocks of GPS data received through telemetry link 30. The GPS data blocks and the PR and DR measurements are provided to the data processing workstation 70 where they are recorded and the position and velocity of the sensor 10 is computed. The data collected from the GPS reference receiver 60 is used to provide aiding data to the GPS data processor 50 in the form of visible satellite IDs, prepositioning code phase and carrier doppler, and the phase changes caused by the 50-bps navigation data. Differential corrections may also be provided to improve the accuracy of the GPS navigation solution.

In the preferred embodiment of the present invention, 25 milliseconds of data is provided in each data block. This provides a doppler estimate to an accuracy of 0.1 m/s and a PR measurement to an accuracy of 20 meters. With a 50-kbps telemetry link, a position and velocity fix can be provided at a 1-Hz rate. When using a Kalman filter in the data processing workstation 70, velocity information will be provided to an accuracy of 0.1 m/s and position information to an accuracy of better than 10 meters after 10 seconds under low accelerations of less than 1 m/s/s.

While the preferred embodiment of the GPS tracking system of the present invention has been described above in connection with radiosondes, it should be understood that the present invention may be employed to track sonobuoys, both surface and underwater sea-based vehicles, air-based vehicles such as balloons, conventional aircraft, and satellites, and land based vehicles, as well as personnel, and even animals, for example.

We claim:

1. A tracking system employing global positioning system (GPS) satellites for determining the position of one or more objects to be tracked, the tracking system comprising:

sensor means, mounted on each object, for receiving signals provided by a plurality of visible GPS satellites and for recording and buffering sensor data, comprising raw satellite signals that are periodically sampled over a predetermined time window;

workstation means for receiving and storing said sensor data, for processing said sensor data to compute pseudo-range and delta-range data for periodically computing, from said pseudo-range and delta-range data, position and velocity information relative to the one or more objects, and for displaying the computed position and velocity information to an operator at a central location, said workstation means further comprising a GPS reference receiver for providing aiding data to facilitate searching, acquiring, and tracking said raw satellite signals received by said sensor means; and a data telemetry link coupling said sensor means and said workstation means, for transferring the recorded and buffered sensor data from said sensor means to said workstation means at a transfer rate that is lower than a rate at which said raw satellite signals were sampled by said sensor means.

2. A tracking system as in claim 1 wherein said sensor data further comprises selected telemetry data interleaved with said raw satellite signals.

3. A tracking process employing global positioning system (GPS) satellites for determining the position and velocity of each of one or more objects to be tracked, the process comprising:

mounting a sensor on each object;

receiving raw satellite signals at the sensor provided by a plurality of GPS satellites visible to the sensor;

periodically sampling said raw satellite signals over a predetermined time window to form sensor data;

recording and buffering said sensor data within the sensor;

transmitting said recorded and buffered sensor data over a data telemetry link at a transmission rate that is lower than a rate at which said raw satellite signals were sampled;

providing a centrally-located GPS workstation for receiving the transmitted sensor data;

providing a GPS data processor within said GPS workstation for processing said recorded and buffered sensor data to compute GPS pseudo-range and delta-range measurements during the time window in which the raw satellite signals were sampled;

providing a GPS reference receiver within said GPS workstation for generating aiding data to facilitate searching, acquiring, and tracking said raw satellite signals received by said sensor; and processing the computed GPS pseudo-range and delta-range measurements in said centrally-located GPS workstation to compute the position and velocity of said one or more objects during the time window in which the received raw satellite signals were sampled.

4. A tracking process as in claim 3 further comprising the step of interleaving said periodically sampled raw satellite signals with selected telemetry data to form said sensor data.

5. A tracking process as in claim 4 wherein the step of providing a GPS data processor for processing said recorded and buffered sensor data comprises interatively processing the received telemetry data to compute a code phase and carrier frequency for each of said plurality of PGS satellites visible to the sensor.

6. A tracking process as in claim 5 wherein the step of iteratively processing the received telemetry data comprises the steps of complex multiplication and accumulation performed by table look-up.

7. A tracking process as in claim 5 wherein the step of accumulation comprises accumulation of two 16-bit words performed in a single 32-bit addition step.

* * * * *